United States Patent
Chliwnyj et al.

(10) Patent No.: US 6,798,607 B2
(45) Date of Patent: Sep. 28, 2004

(54) DEFINED SIGNAL INJECTION TO CALIBRATE SERVO INDEX POSITIONS EMPLOYING AN INDEPENDENT POSITION SENSOR

(75) Inventors: Alex Chliwnyj, Tucson, AZ (US); Edward George Butt, Tucson, AZ (US); David Lee Swanson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 339 days.

(21) Appl. No.: 10/035,182

(22) Filed: Jan. 4, 2002

(65) Prior Publication Data

US 2003/0128457 A1 Jul. 10, 2003

(51) Int. Cl.[7] ............................................. G11B 5/584
(52) U.S. Cl. .................... 360/77.12; 360/75; 360/78.02
(58) Field of Search .............................. 360/75, 69, 76, 360/77.01, 77.12, 78.01, 78.05, 78.02

(56) References Cited

U.S. PATENT DOCUMENTS

| | | | |
|---|---|---|---|
| 5,448,430 A | * 9/1995 | Bailey et al. | 360/77.12 |
| 5,490,149 A | 2/1996 | Nylander-Hill | 395/182.03 |
| 5,872,672 A | 2/1999 | Chliwnyj et al. | 360/77.12 |
| 5,946,159 A | 8/1999 | Chliwnyj et al. | 360/77.12 |

* cited by examiner

Primary Examiner—David Hudspeth
Assistant Examiner—Jason Olson
(74) Attorney, Agent, or Firm—John H. Holcombe

(57) ABSTRACT

Calibration of magnetic tape servo index positions, which are laterally offset from edges and measured by ratios of dissimilar servo signals. A defined signal is injected into the track following servo to modulate the lateral position of the servo sensor, which is detected by an independent position sensor. Logic converts the detected lateral positions and servo signals to frequency components; selects injected signal frequency components; converts the selected frequency components to lateral positions and servo signals, and fits a curve to the converted lateral positions with respect to the converted servo signals to calibrate the index positions.

21 Claims, 12 Drawing Sheets

DEFINED SIGNAL INJECTION TO CALIBRATE SERVO INDEX POSITIONS EMPLOYING AN INDEPENDENT POSITION SENSOR

DOCUMENTS INCORPORATED BY REFERENCE

Commonly assigned U.S. Pat. No. 5,946,159 is incorporated for its showing of a track following servo system for following servo track edges of dissimilar servo signals, and employing a non-servo, or independent, position sensor. Commonly assigned U.S. patent application Ser. No. 09/413,327, filed Oct. 7, 1999 is incorporated for its showing of a servo position detector and a method for detecting and track following an index servo position displaced with respect to an edge of a servo track.

FIELD OF THE INVENTION

This invention relates to servo track following of servo edges of dissimilar servo signals recorded on magnetic tape, and, more particularly, to calibrating indexed servo positions displaced with respect to the servo edges.

BACKGROUND OF THE INVENTION

Magnetic tape data storage typically provides prerecorded servo tracks to allow precise positioning of a tape head which has servo sensors, with respect to the prerecorded servo tracks. The tape head comprises one or more read/write elements precisely positioned with respect to the servo sensors and which trace data tracks parallel to the servo tracks. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

The tape head has several spaced apart servo sensors for each servo edge, with the result that the tape head may be stepped between the servo sensors, each positioning the read/write elements at different interleaved groups of data tracks.

Typically, for a given servo pattern of a set of two servo edges, the outer servo signals are recorded first, and the center servo signal is recorded last, to provide the servo edges. As pointed out by the incorporated '159 patent, the nominal separation distance between the servo edges of each set of servo edges is a certain distance, such as 80 microns, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track. Commonly assigned U.S. patent application Ser. No. 09/703,905, filed Nov. 2, 2000, illustrated the use of curve fitting for servo calibration to enhance precision.

The tape path of the above IBM 3590 is a guided tape path, limiting the lateral movement of the magnetic tape so that the guiding noise is small enough that the step from one ratio to another was discernible. Another approach is required for open channel guiding in which the magnetic tape can move laterally a distance which is substantially greater than that between index positions, thereby introducing substantial noise into the guiding process. The guiding signal to noise ratio thus becomes negative, with the guiding noise being far larger than the step from one ratio to another, making it impossible to gather data points with a monotonic slope to conduct a calibration of the servo ratios.

SUMMARY OF THE INVENTION

An object of the present invention is to calibrate the servo index positions which are laterally offset from servo edges recorded on magnetic tape in an environment where the magnetic tape is subject to movement in the lateral direction.

A tape drive servo system and method are provided for calibrating servo index positions of a magnetic tape. The magnetic tape has at least one set of parallel linear servo edges, wherein each servo edge comprises an interface between two dissimilar recorded servo signals, and each set of servo edges comprises one of the servo edges on each of opposite lateral sides of a middle recorded servo signal. The servo calibration is of the servo index positions which are laterally offset from the linear servo edges and are measured by the ratios of the dissimilar recorded servo signals.

The servo system comprises at least one servo sensor of a tape head, wherein the tape head is movable laterally of the magnetic tape, and wherein the servo sensor senses the recorded servo signals of the magnetic tape comprising at least one servo edge of dissimilar recorded servo signals. The servo system also comprises a servo detector coupled to the servo sensor for determining a ratio of the servo signals sensed by the servo sensor and providing digital servo signals at a predetermined sample rate; an independent position sensor to sense lateral position of the magnetic tape with respect to the tape head servo sensor; a servo loop for positioning the tape head laterally with respect to the magnetic tape to track follow the sensed servo signals at specific position error signals representing displacements from the linear servo edges as determined from ratios of the sensed servo signals as determined by the servo detector; and logic coupled to the servo detector, the independent position sensor, and the servo loop.

The logic operates the servo loop to inject a defined signal to modulate the lateral position of the head and, thereby, the servo sensor.

In one embodiment, the logic operates the servo loop to laterally position the servo sensor to sense the servo signals at continually altered digital set points of the ratios of the sensed servo signals. The set points are altered at the sample rate of the servo loop, and are altered to inject a predetermined sinusoidal pattern single frequency positioning signal, whereby the servo loop track follows the linear servo edges with the servo loop at the continually altered digital set points.

The logic digitally determines, from the independent position sensor at the sample rate, the lateral positions of the tape head servo sensor with respect to the servo edge locations of the magnetic tape; and digitally determines, from the servo detector of the servo loop, the ratios of the servo signals sensed by the servo sensor, and provides digital servo signals; converts the digitally determined independent position sensor lateral positions to frequency components; and converts the digitally determined ratios of the servo signals to frequency components; selects from the frequency components of the independent position sensor lateral positions, and from the frequency components of the ratios of the servo signals, the predetermined sinusoidal pattern single frequency and at least one harmonic thereof; and converts the selected frequency components to independent position sensor lateral positions, and converts the selected frequency components to ratios of the servo signals.

The logic fits a curve to the converted independent position sensor lateral positions of the selected frequency components with respect to the converted ratios of the servo signals to calibrate expected position error signals for the servo loop at the laterally offset servo index positions with respect to the sensed servo edge(s).

In one embodiment, the injected predetermined sinusoidal pattern single frequency positioning signal comprises a single frequency selected so that the single frequency and major harmonics thereof each differs from intrinsic operational frequencies of the track following servo system and/or tape system.

In one embodiment, the logic converts the digitally determined independent position sensor lateral positions to frequency components by conducting fast Fourier transforms (FFT) of the digitally determined independent position sensor lateral positions; and converts the digitally determined ratios of the servo signals to frequency components by conducting fast Fourier transforms (FFT) of the digitally determined ratios of the servo signals. The logic further converts the selected frequency components to independent position sensor lateral positions and the selected frequency components to ratios of servo signals, both by conducting inverse fast Fourier transforms (IFFT) of the selected frequency components.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
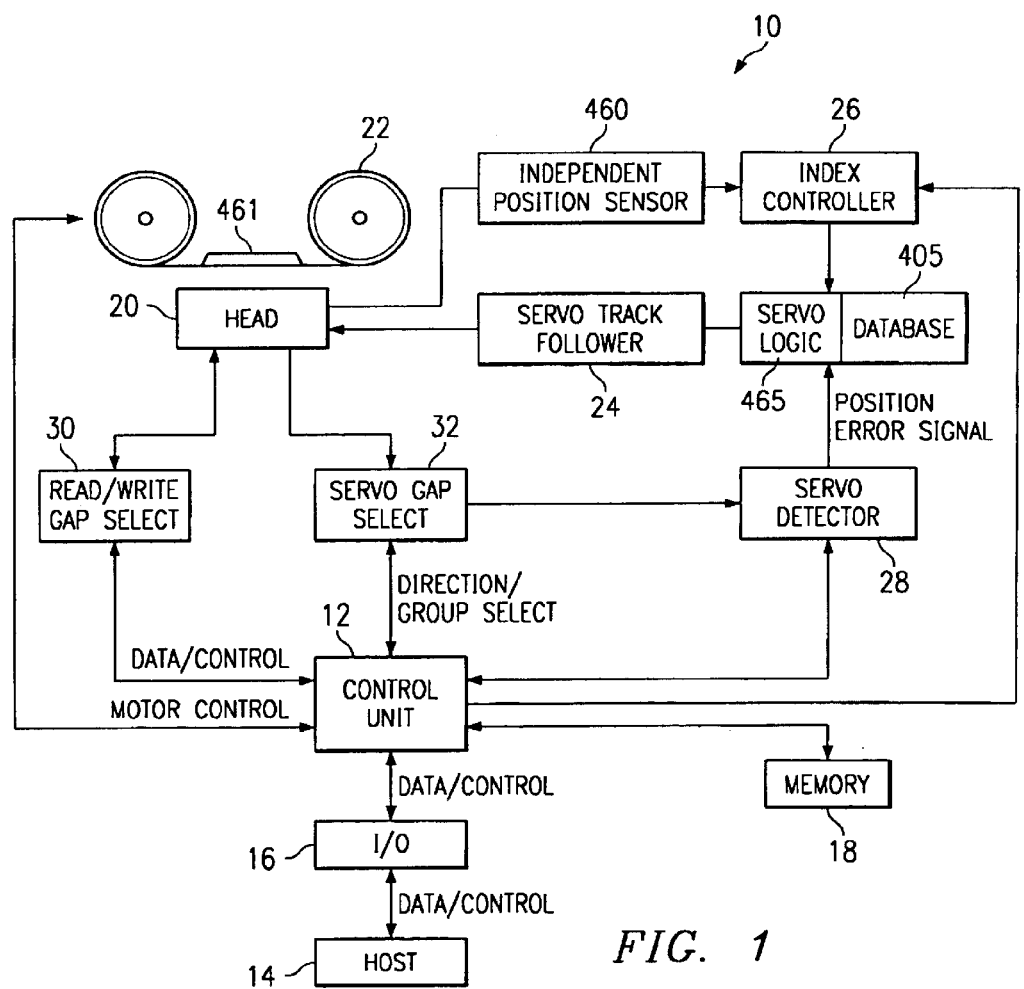
FIG. 1 is a block diagram of an embodiment of a magnetic tape system employing the present invention for calibration of servo index positions.

Referring to FIG. 1, a magnetic tape data storage system 10 is illustrated. One example of a magnetic tape data storage system in which the calibration system of the present invention may be employed is the IBM 3590 magnetic tape subsystem. A control unit 12 is provided which receives and transmits data and control signals to and from a host device 14 via an interface 16. The control unit 12 is coupled to a memory device 18, such as a random access memory for storing information and computer programs. An example of a host device 14 comprises an IBM RS/6000 processor.

A multi-element tape head 20, such as is well known in the art, includes a plurality of data read/write elements to record and read data onto and from a magnetic tape 22, and servo sensors or read elements to read servo signals comprising prerecorded linear servo edges on the magnetic tape 22.

A tape reel motor system (not shown) of the tape data storage system moves the tape 22 in the longitudinal direction while it is supported by a tape deck 461 for reading and writing. The tape deck does not precisely hold the tape in position laterally. Rather, open channel guiding is employed in which the magnetic tape can move laterally a distance which is substantially greater than that between index positions, thereby introducing substantial noise into the guiding process. The guiding signal to noise ratio thus becomes negative, with the guiding noise being far larger than the step from one ratio to another, making it impossible to gather data points with a monotonic slope to conduct a calibration of the servo ratios.

A servo track follower 24 directs the motion of the magnetic tape head 20 in a lateral or transverse direction relative to the longitudinal direction of tape motion. The control unit 12 is coupled to the tape reel motors and controls the direction, velocity and acceleration of the tape 22 in the longitudinal direction.

The data tracks on the tape 22 are arranged in parallel and are parallel to the linear servo edges. Thus, as the servo track follower 24 causes the servo sensors of the magnetic tape head to track follow a linear servo edge or a servo index position laterally offset from a servo edge, the data read/write elements track a parallel group of the data tracks. If it is desired to track another parallel group of data tracks, the magnetic tape head 20 is indexed laterally to another servo edge or to another servo index position, or a different servo sensor is aligned with the same or a different servo edge or servo index position.

When the magnetic tape head 20 is to be moved to a selected index position, an index controller 26 is enabled by the control unit 12, receiving a mechanical lateral position signal from an independent position sensor 460 and transmits an appropriate signal to servo logic 465 to select the appropriate servo track, while the control unit 12 transmits an appropriate signal to a servo gap selector 32 to select the appropriate servo sensor. The independent position sensor 460 is discussed in the incorporated U.S. Pat. No. 5,946,159, where it is called a non-servo position sensor, and indicates the lateral mechanical position of the tape head 20 with respect to the tape deck 461. Over the course of longer distances of longitudinal tape movement, the open channel guiding system will allow the tape to move laterally with respect to the tape deck 461. In accordance with the present invention, the independent position sensor 460, in limited distances of tape movement, accurately tracks the lateral mechanical position of the tape head 20, and therefore of the servo sensor(s), with respect to the magnetic tape 22 and of the servo edges. The logic 465 operates the servo track follower 24 in accordance with the present invention to calibrate the servo index positions as sensed by the servo sensor with respect to the parallel sets of linear servo edges, as will be explained. The logic 465 may comprise a programmed PROM, ASIC or microprocessor. The tape system 10 may be bidirectional, in which ones of the read/write elements are selected for one direction of longitudinal tape movement, and others of the read/write elements are selected for the opposite direction of movement. The control unit 12 additionally selects the appropriate ones of the read/write elements by transmitting a signal to a read/write gap select unit 30.

Once a servo edge or edges are selected, the servo gap selector 32 provides the servo signals to a servo detector 28, which information is employed by servo logic 465 to position the tape head 20 to track follow the detected edges.

In accordance with the present invention, servo logic 465 employs the servo information sensed by the servo detector 28 and the mechanical positioning information from the independent position sensor 460 to calibrate the track following servo. The track following servo logic is also implemented in the servo logic 465, and may comprise the servo logic of the incorporated U.S. patent application Ser. No. 09/413,327, employing the sensed servo signals to determine the ratios of the sensed servo signals, which are employed in accordance with the present invention to calibrate the servo index positions of the track following servo 24.

Figure 2:
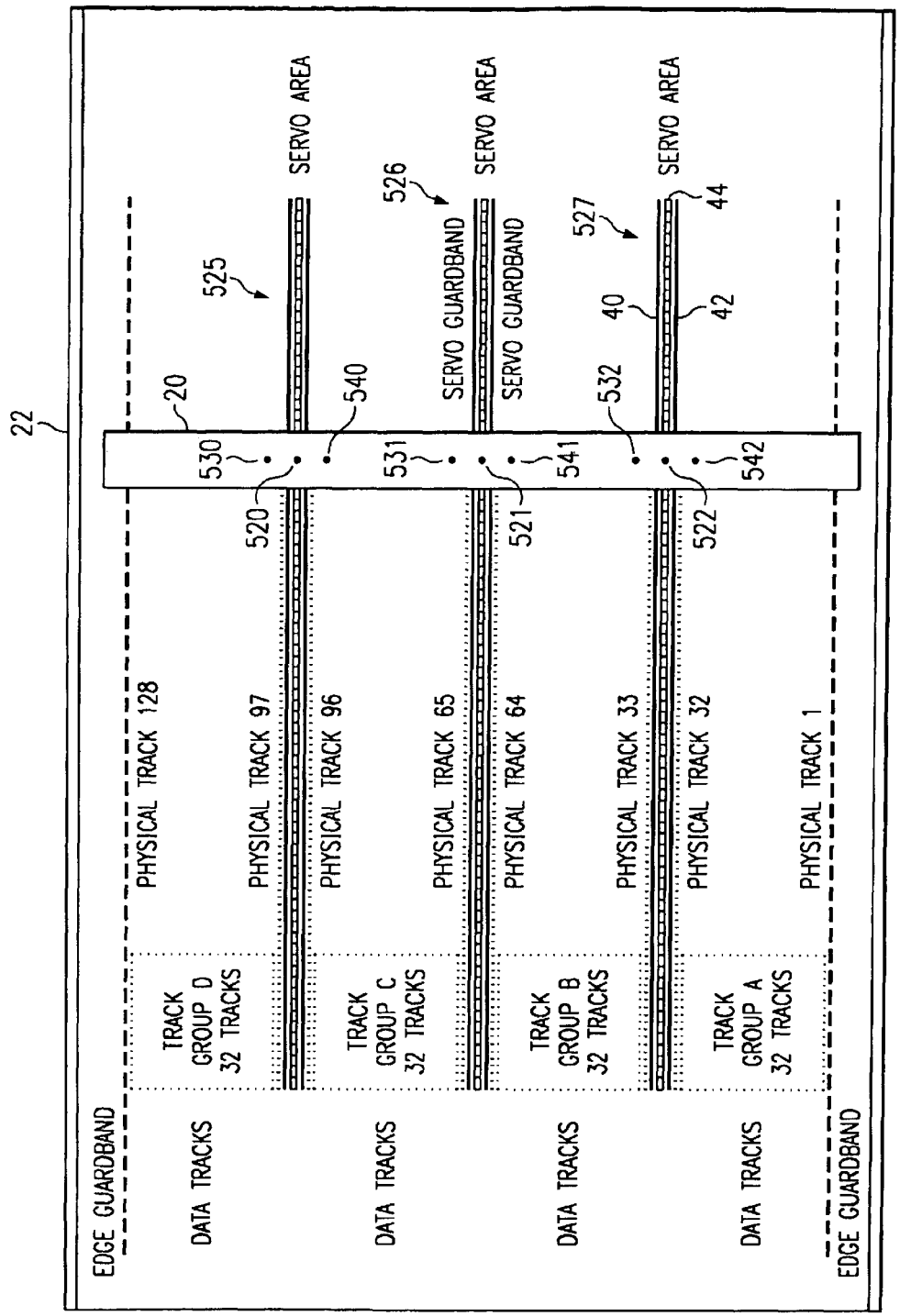
FIG. 2 is a diagrammatic illustration of a magnetic tape having three parallel sets of linear servo edges, each servo edge comprising an interface between two dissimilar recorded servo signals.

Referring to FIG. 2, a plurality, for example, three, parallel sets of linear servo edges 525, 526 and 527 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors 520–522 are spaced apart in the tape head to sense the servo signals at each corresponding edge. Additional pluralities of servo sensors 530–532 and 540–542 may be provided to allow positioning of the tape head at additional data tracks.

Figure 3:
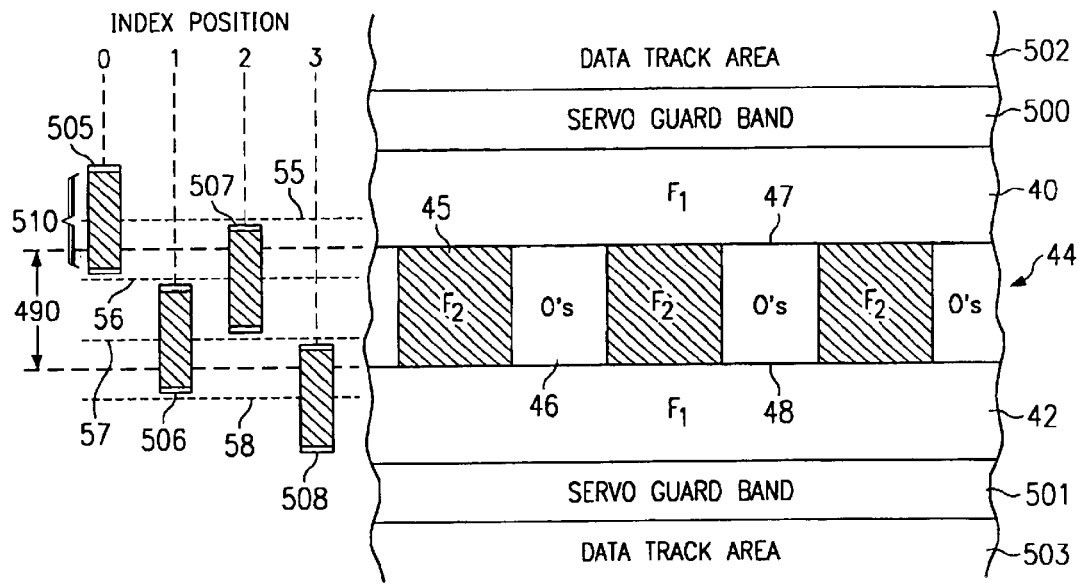
FIG. 3 is a detailed diagrammatic representation of a magnetic tape format providing four servo index positions in one set of two linear servo edges of the magnetic tape of FIG. 2.

Referring to FIG. 3, the typical magnetic tape format of servo signals to form linear servo edges 47 and 48 comprising an interface between two dissimilar recorded servo signals is illustrated. One set of servo edges comprises outer bands 40 and 42, having a recorded pattern of a constant amplitude signal of a single first frequency, on either side of an inner band 44 of the other servo signal, having a recorded pattern alternating between a constant amplitude burst signal 45 of a single second frequency and a zero amplitude null signal 46.

Typically, the servo signals 40, 44 and 42 are provided with servo guard bands 500 and 501 to protect the outer bands 40 and 42 from noise resulting from the data track areas 502 and 503.

It is desirable that the servo edges are separated by a predetermined nominal distance 490 employed for prerecording the servo signals. Typically, the outer servo signals 40, 42 are recorded first, and the center servo signal 44 is recorded last, to provide the servo edges 47, 48. There is, typically, variation in the magnetic separation 490 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks, and, the average of the servo signals may be employed to track follow the servo tracks. Thus, the difference in physical distance and the amplitude compensation may tend to offset each other with respect to the resultant apparent distance between the servo tracks. These actions may provide an adequate signal for track following at the servo edges.

However, to increase data track density, servo index positions 55, 56, 57 and 58 are provided which are laterally offset with respect to the sensed servo edges of the set of linear servo edges. As an example, the servo index positions may be offset laterally about one quarter the width of the inner band 44 away from the servo edge in either direction, providing four index positions. Servo sensors 505, 506, 507 and 508 are provided and are substantially the same sensing width 510 as the predetermined distance 490. The indexed positions are determined by measuring the ratio between the amplitudes of the two dissimilar recorded servo signals, e.g., as measured by the servo detector 28 of FIG. 1, and called the "position error signal", or "PES". The servo logic 465 operates the servo track follower 24 to track follow at the desired measured ratio. For example, the measured ratio will be the ratio between the sum of the sensed outer band signal 40 plus the inner band signal 45, and the sensed outer band signal 40, giving effect to the null 46. The illustrations and descriptions herein employ this ratio. Alternatively, the measured ratio may be the ratio between the outer band signal 40 at frequency $F_1$ and the inner band signal 45 at frequency $F_2$. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

To track follow an edge or edges, once a servo edge or edges are selected, the servo gap selector 32 of FIG. 1 provides the servo signals to a servo detector 28, which digitally detects the servo signals at a predetermined sample rate, and provides the position error signal (PES) or ratios of each of the selected servo sensors 520–522, 530–532 or 540–542 of FIG. 2. The servo logic 465 employs the detected ratios (PES) to determine the displacement from the edges and operates the servo loop servo track follower 24 to position the tape head 20 to track follow at the desired displacement from the edges.

Figure 4:
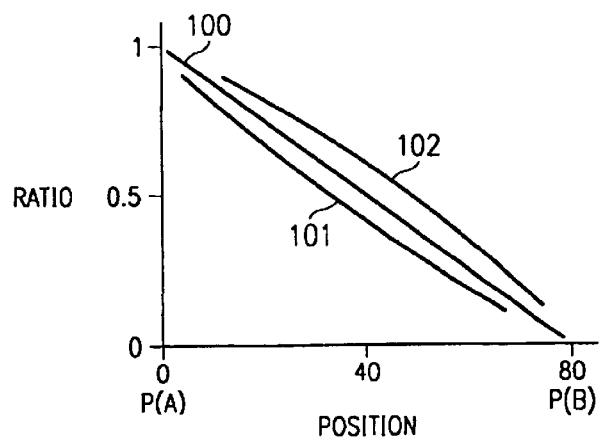
FIG. 4 is a diagrammatic representation of three examples of the ratios between the sensed servo signals of a servo edge of FIG. 3 at various lateral positions, where the recorded servo signals generating the edge are of three different amplitudes.

FIG. 4 illustrates examples of distortion of the measured ratios between the sensed servo signals of one linear servo edge, at various lateral positions of the servo sensors. Referring additionally to FIG. 3, line 100 represents an ideal slope of the measured ratios from a ratio of "1", at which the servo sensor is at position "$p_{(A)}$", which is centered on and senses only the outer band 40 or outer band 42, to a ratio of "0" at which the servo sensor is at position "$p_{(B)}$" which is centered on and senses only the inner band 44. Line 101 represents the varying slope of the ratios where the center recorded servo signal 44 generating the edges is of a relatively strong amplitude. Line 102 represents the varying slope of the ratios where the center recorded servo signal 44 generating the edges is of a relatively weak amplitude. Employing the same ratio setting to position the tape head at various servo index positions for each of the linear edges 100–102 may result in track misregistration.

Copending and commonly assigned U.S. patent application Ser. No. 09/703,905, filed Nov. 2, 2000 discusses servo calibration of laterally guided magnetic tape, gathering data points with a monotonic slope and curve fitting to the gathered data points.

As discussed above, the tape deck 461 in FIG. 1 does not precisely hold the tape in position laterally. Rather, open channel guiding is employed in which the magnetic tape can move laterally a distance which is substantially greater than that between index positions, e.g., index positions 55–58 of FIG. 3, thereby introducing substantial noise into the guiding process. The guiding signal to noise ratio thus becomes negative, with the guiding noise being far larger than the step from one ratio to another, making it impossible to gather data points with a monotonic slope to conduct a calibration of the servo ratios.

Referring to FIGS. 1–14, in accordance with an embodiment of the present invention, servo logic 465 is provided with a database 405 and is coupled to the servo detector 28, the servo track follower 24, and the independent position sensor 460, all of FIG. 1. The logic 465 operates the servo loop, comprising servo gap selector 32, servo detector 28 and servo track follower 24, to inject a defined signal to modulate the lateral position of the head and, thereby, the servo sensor.

Figure 5:
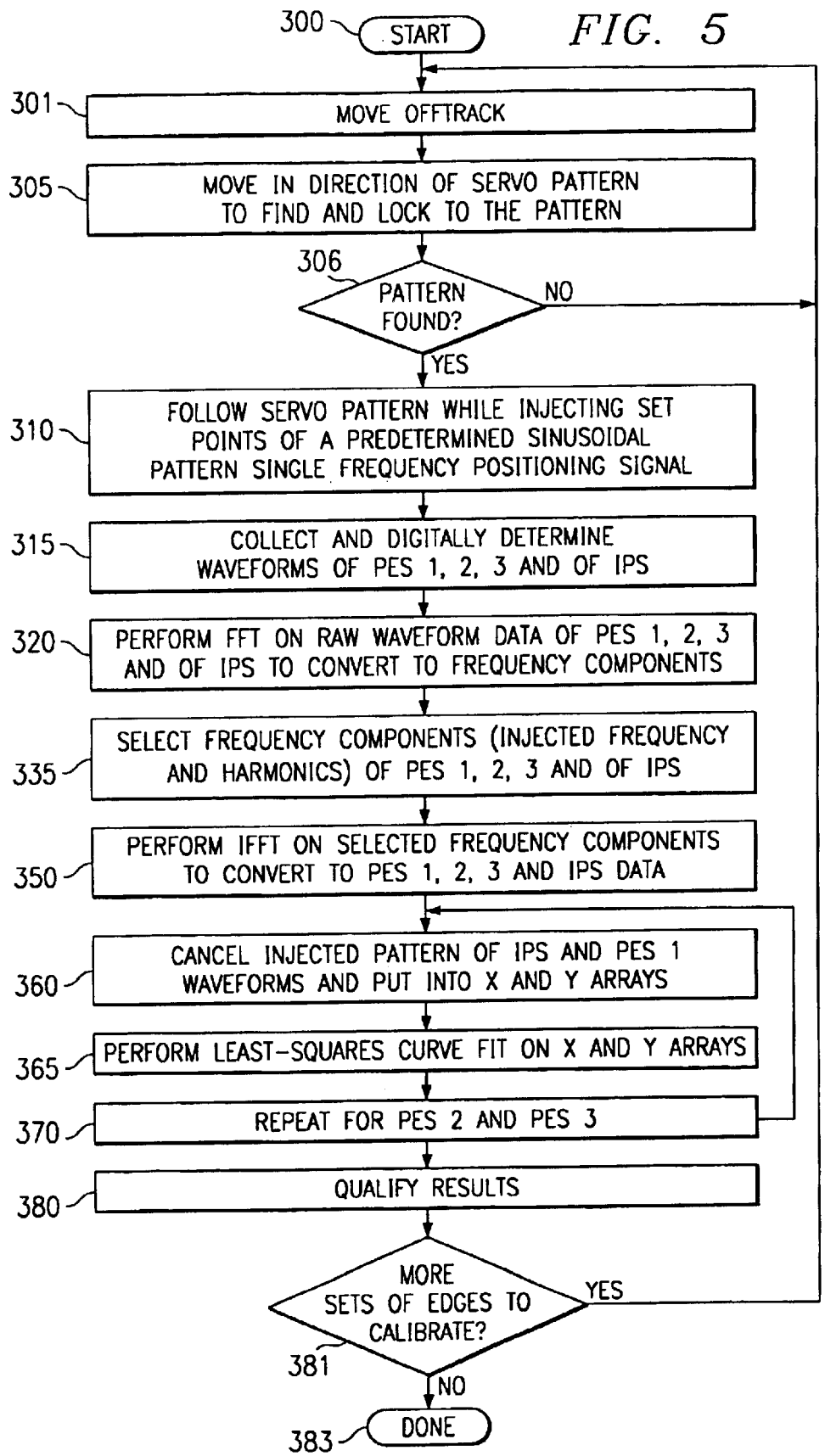
FIG. 5 is a flow chart depicting an embodiment of the present invention for calibrating servo index positions of a magnetic tape for track following.

Starting at step 300 in FIG. 5, the logic first operates the servo loop to, in step 301, move off-track to begin calibration of the servo index positions, e.g., positions 55–58 of FIG. 3. In step 305, the logic operates the servo loop to move in the direction of the servo pattern to be calibrated, in order to find and lock to the pattern. Step 306 determines whether the servo pattern has been found. If not, the process cycles back to step 301 to repeat the movement off-track.

Upon finding and locking to the servo pattern to be calibrated in step 306, in one embodiment, the logic 465 operates the servo loop, in step 310, to laterally position the servo sensor to sense the servo signals at continually altered digital set points of the ratios of the sensed servo signals. The set points are altered at the sample rate of the servo loop, and are altered to inject a predetermined sinusoidal pattern single frequency positioning signal, whereby the servo loop track follows the linear servo edges, e.g., edges 47 or 48 of FIG. 3 at each of the parallel sets of linear servo edges 525, 526 and 527 of FIG. 2, with the corresponding plurality of laterally offset servo sensors 520–522, or with servo sensors 530–532 or 540–542, of the servo loop at the continually altered digital set points.

In one embodiment, the injected predetermined sinusoidal pattern single frequency positioning signal comprises a single frequency selected so that the single frequency and major harmonics thereof each differs from intrinsic operational frequencies of the track following servo system and/or of the tape drive. As examples, the single frequency is selected so that the single frequency and major harmonics thereof differ from the frequencies of the tape reels 22 of FIG. 1, the tape motor(s), and the cooling fans, and any resonant frequencies of the servo system. As a further example, the sinusoidal pattern is modulated from a ratio of 0.1 to a ratio of 0.9.

The signal is now dominated by the sinusoidal pattern and not by the tape movement. The frequency of the sinusoidal pattern is known precisely, and anything that is not at the frequency of the sinusoidal pattern, or its harmonics, is noise in the measurement.

Further in accordance with the present invention, the logic, in step 315, determines the independent position sensor 460 sensed lateral positions with respect to the servo edge locations, and the ratios of the servo signals sensed by the servo sensors 520–522, 530–532 or 540–542 of FIG. 2.

Figure 6:
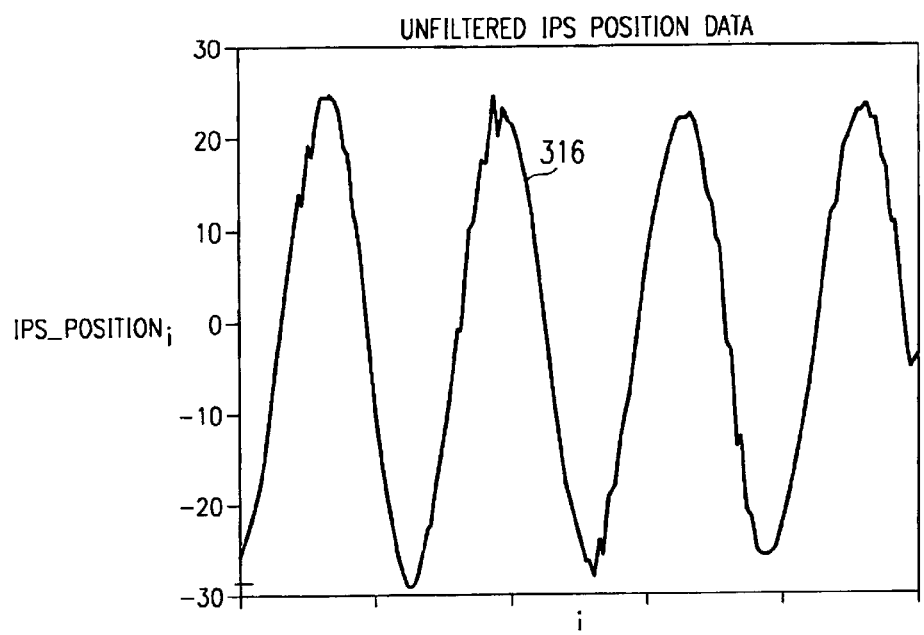
FIG. 6 is a diagrammatic representation of the lateral positions of the tape head servo sensor with respect to the servo edge locations of the magnetic tape, from the independent position sensor of the magnetic tape system of FIG. 1.
Figure 7:
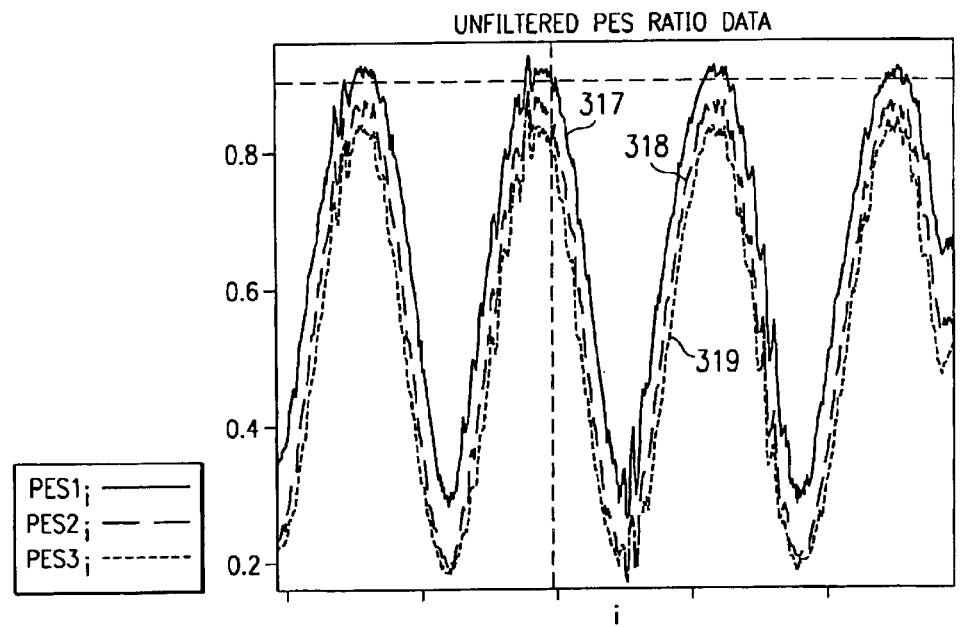
FIG. 7 is a diagrammatic representation of the ratios of the servo signals sensed by three servo sensors, from the servo detector of the servo loop of the magnetic tape system of FIG. 1.

As examples, FIG. 6 illustrates a waveform 316 of the independent position sensor sensed lateral positions of the tape head servo sensor with respect to the servo edge locations of the magnetic tape, and FIG. 7 illustrates waveforms 317, 318 and 319, representing, respectively, the ratios of the servo signals sensed by three servo sensors, from the servo detector of the servo loop of the magnetic tape system of FIG. 1.

As discussed above, the servo detector 28 in FIG. 1 provides digitally detected ratios (PES) of each of the servo sensors at a predetermined sample rate to determine the displacement from the edges, which is provided to the logic servo 465. In accordance with the present invention, in step 315, the logic digitally determines, from the independent position sensor 460 of FIG. 1, at the sample rate of the track following servo system, the lateral positions of the tape head servo sensor with respect to the servo edge locations of the magnetic tape. As discussed above, the independent position sensor 460 accurately tracks the lateral mechanical position of the tape head 20, and therefore of the servo sensor(s), with respect to the magnetic tape 22 and of the servo edges.

Additionally, in step 315, the servo logic 465 of FIG. 1 receives the digitally determined, from the servo detector 28 of the servo loop, ratios of the servo signals sensed by the servo sensor or servo sensors 520–522, 530–532 or 540–542, at the sample rate of the servo loop.

Thus, in step 315, the digitally determined waveforms of the independent position sensor 460 and of servo sensors, as an example, three servo sensors representing respectively "PES 1", "PES 2", and "PES 3", have been provided. The servo logic 465 of FIG. 1 adjusts the IPS and PES data to correlate with the location of the servo pattern that is being calibrated, as is known to those of skill in the art.

As discussed above, the signal is now dominated by the sinusoidal pattern and not by the tape movement. The frequency of the sinusoidal pattern is known precisely, and anything that is not at the frequency of the sinusoidal pattern, or its harmonics, is noise in the measurement.

In step 320 of FIG. 5, the servo logic 465 of FIG. 1 converts the digitally determined independent position sensor lateral positions to frequency components; and converts the digitally determined ratios of the servo signals to frequency components.

In one embodiment, the servo logic converts the digitally determined independent position sensor lateral positions to frequency components by conducting fast Fourier transforms (FFT) of the digitally determined independent position sensor lateral positions; and converts the digitally determined ratios of servo signals to frequency components by conducting fast Fourier transforms (FFT) of the digitally determined ratios of servo signals.

The FFT of each of the signals is performed to get the signals into the frequency domain where the noise can be removed.

Figure 8:
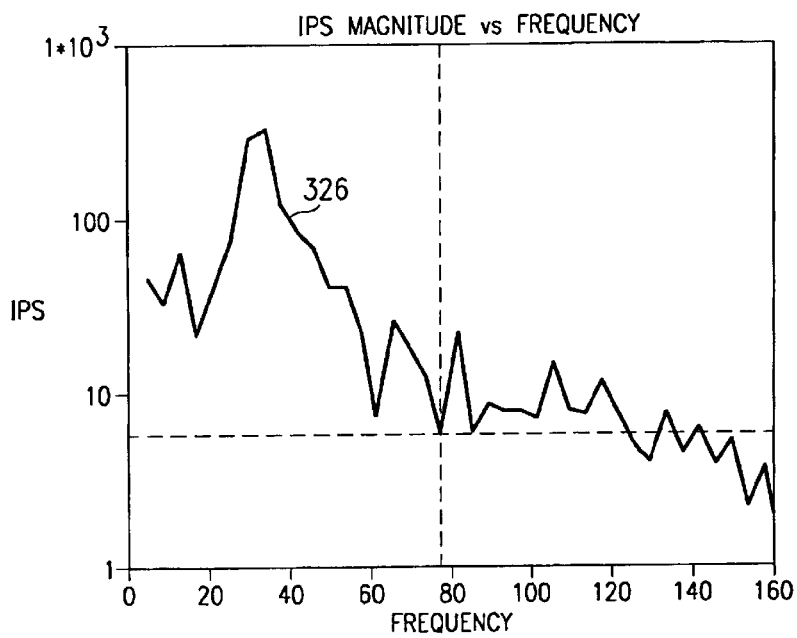
FIG. 8 is a diagrammatic representation of frequency domain of the digitally determined lateral positions of the independent position sensor from FIG. 6, which have been digitally determined at the sample rate of the servo loop.
Figure 9:
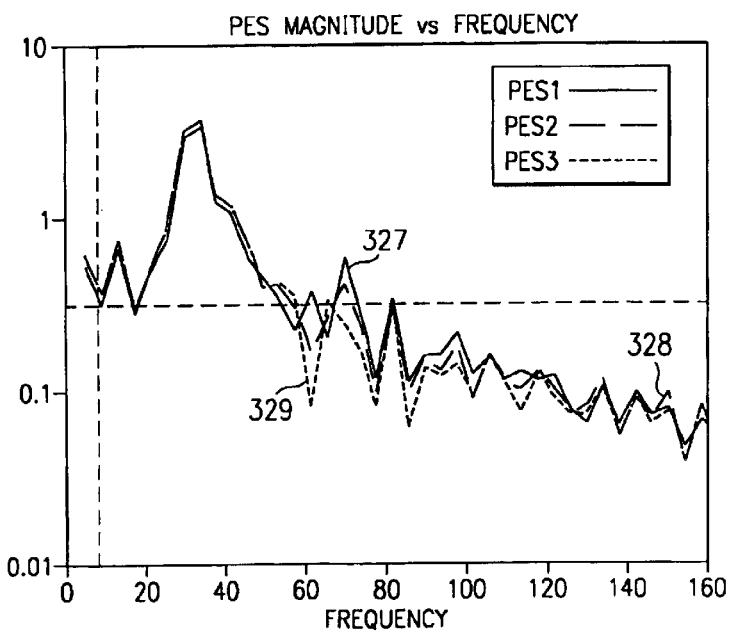
FIG. 9 is a diagrammatic representation of the frequency domain of the digitally determined ratios of the servo signals sensed of the servo sensors of FIG. 7, which have been digitally determined at the sample rate of the servo loop.

FIG. 8 illustrates a waveform 326 representing the frequency domain of the digitally determined lateral positions of the independent position sensor from FIG. 6; and FIG. 9 illustrates waveforms 327, 328 and 329, representing, respectively, the frequency domain of the digitally determined ratios of the servo signals sensed of the servo sensors of FIG. 7, which have been digitally determined at the sample rate of the servo loop.

In step 335, the servo logic 465 of FIG. 1 selects from the frequency components of the independent position sensor lateral positions, and from the frequency components of the ratios of the servo signals, the predetermined sinusoidal pattern single frequency and at least one harmonic thereof, to thereby zero the noise. In one embodiment, there is insubstantial useful information beyond the fourth harmonic. Hence, in step 335, all of the frequency points are set to zero except for the single frequency of the injected sinusoidal pattern and up to four lowest frequency harmonics. The DC is also kept so as to provide an offset between the three PES channels.

Thus, the present invention has gone from a situation in which the tape guiding noise is dominant, to one where the signal of interest is a sinusoidal pattern at a known single frequency. In the frequency domain, the noise, not only the tape guiding noise, but also noise resulting from tape defects, is filtered out.

Figure 10:
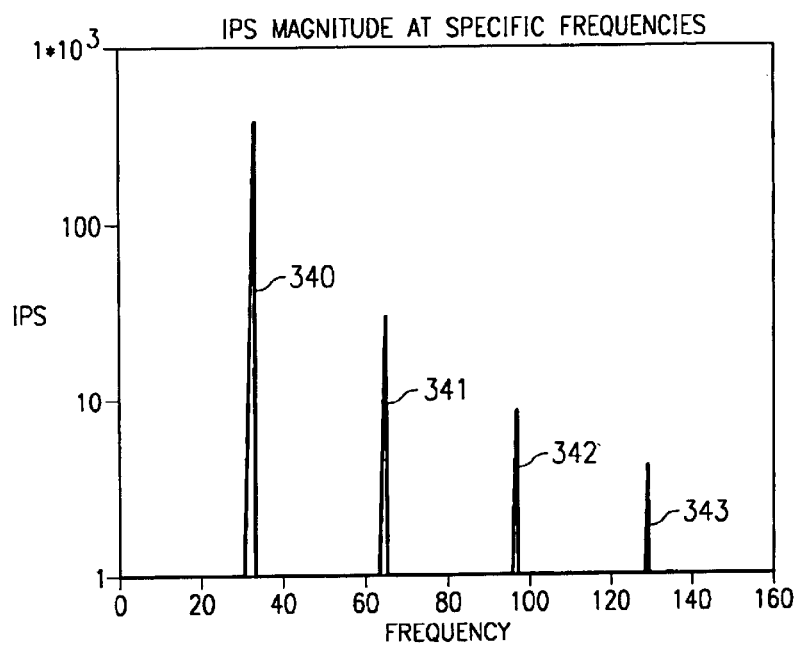
FIG. 10 is a diagrammatic representation of the digitally determined independent position sensor lateral positions of FIG. 8, converted to frequency components from which the predetermined sinusoidal pattern single frequency and harmonics have been selected.
Figure 11:
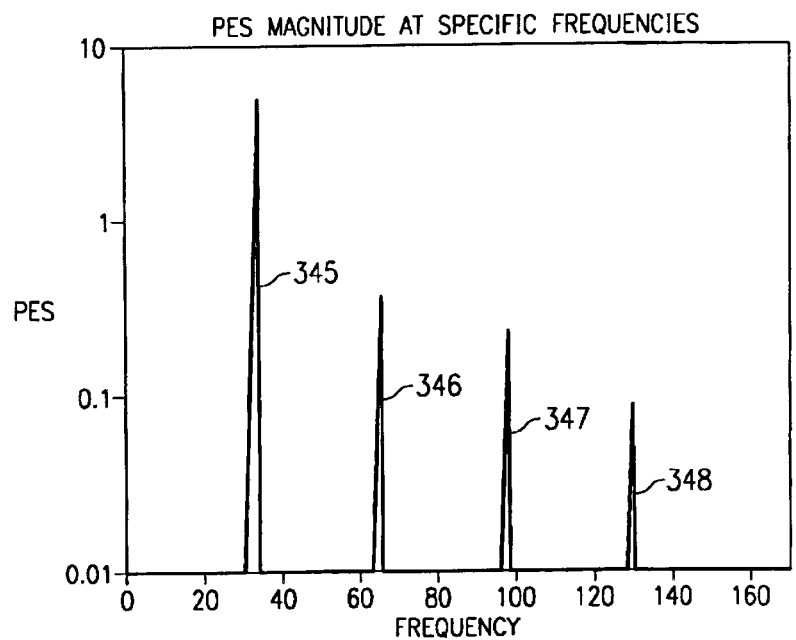
FIG. 11 is a diagrammatic representation of the digitally determined ratios of the servo signals of FIG. 9, converted to frequency components from which the predetermined sinusoidal pattern single frequency and harmonics have been selected.

As examples, FIG. 10 illustrates waveforms representing the digitally determined independent position sensor lateral positions of FIG. 8, converted to frequency components from which the predetermined sinusoidal pattern single frequency and harmonics have been selected. The predetermined sinusoidal pattern single frequency 340 and three of the harmonics 341, 342 and 343 are illustrated in FIG. 10. FIG. 11 illustrates waveforms representing the digitally determined ratios of the servo signals of FIG. 9, converted to frequency components from which the predetermined sinusoidal pattern single frequency 345 and harmonics 346, 347 and 348 have been selected.

In step 350, the servo logic 465 of FIG. 1 converts the selected frequency components to independent position sensor lateral positions, and converts the selected frequency components to ratios of the servo signals. In one embodiment, the logic converts the selected frequency components to independent position sensor lateral positions and the selected frequency components to ratios of servo signals, both by conducting inverse fast Fourier transforms (IFFT) of the selected frequency components.

The conversion provides the signals to send to a curve fitting routine to generate coefficients for producing the expected PES signals for the index positions from the ratios.

Figure 12:
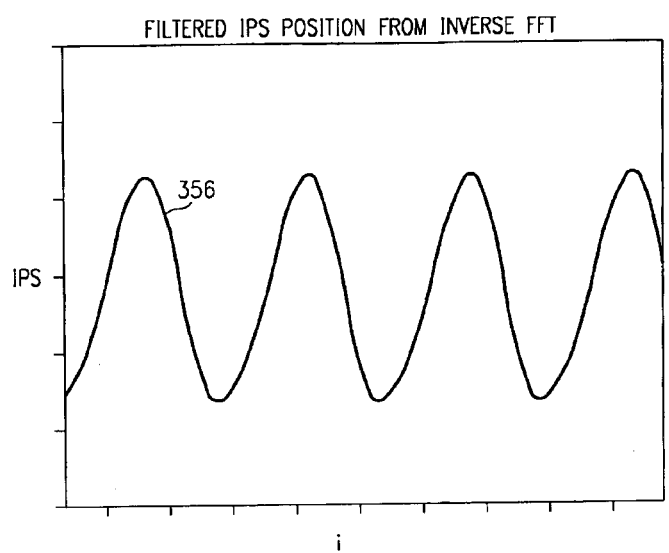
FIG. 12 is a diagrammatic illustration of converted independent position sensor lateral positions, which have been converted from the selected frequency components of FIG. 10.
Figure 13:
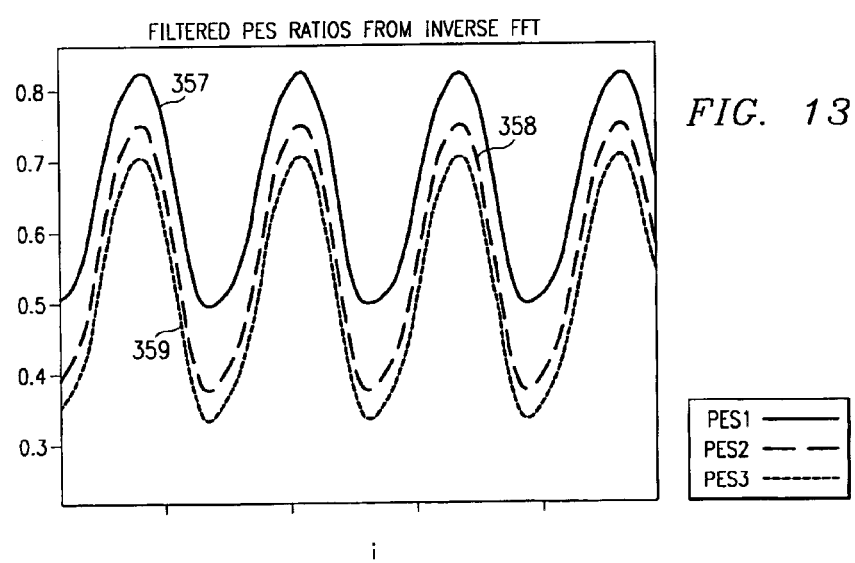
FIG. 13 is a diagrammatic illustration of converted ratios of the servo signals, which have been converted from the selected frequency components of FIG. 11.

As examples, FIG. 12 illustrates a waveform 356 representing converted independent position sensor lateral positions, which have been converted from the selected frequency components of FIG. 10; and FIG. 13 illustrates waveforms 357, 358 and 359, representing, respectively, converted ratios of the servo signals, which have been converted from the selected frequency components of FIG. 11.

In step 360 of FIG. 5, the servo logic 465 of FIG. 1 cancels the injected sinusoid pattern of the converted independent position sensor waveform and of one of the converted ratios of the servo signals of step 350, and puts the data points into an X and Y array. In the first example, the ratios of the servo signals for a "PES 1" are placed into the X-Y array.

In step 365, the servo logic fits a curve to the converted independent position sensor lateral positions of the selected frequency components with respect to the "PES 1" converted ratios of the servo signals to calibrate expected position error signals for the servo loop at the laterally offset servo index positions with respect to the sensed servo edge or edges of the set of linear servo edges.

The curve fitting may comprise a second order curve fitting algorithm, such as discussed in copending and commonly assigned U.S. patent application Ser. No. 09/703,905, filed Nov. 2, 2000, which is directed to curve fitting in servo calibration of laterally guided magnetic tape. Average ratios of the servo sensors are employed therein. Here, the ratios of each servo sensor is individually fitted to a curve.

Briefly, the logic 465 curve fits a two dimensional, second order curve to the ratios of the sensed servo signals with respect to the predetermined displacements for each linear servo edge, making adjustments to the curves. Then, the logic 465 employs the fitted curves to calibrate expected position error signals for the servo loop at the laterally offset servo index positions with respect to the sensed servo edge or edges of the set of linear servo edges.

The method employs ratios for predetermined positions on either side of each edge. Ratios which are at outer positions, for example, ratios of "0" and of "1" cannot be sensed and determined. Hence, at the outer positions, the ratios are calculated by extrapolating from the ratios of the adjacent positions toward the linear servo edge.

Then, a standard curve fit routine is employed to fit the determined ratios of the sensed servo signals with respect to the predetermined displacements to a two dimensional, second order curve for each linear servo edge. An example of a second order curve comprises a quadratic equation:

$$p=b_2 r^2+b_1 r+b_0$$

where: p=position (e.g., measured in microns by the independent position sensor);
r=determined ratio.

At the extrapolated end points where the ratios are theoretically "0" and "1", the curve becomes:

At r=1; $p_{(A)}=b_2+b_1+b_0$;
At r=0; $p_{(B)}=b_0$.

The magnetic characteristics of the servo recording head or of the servo sensor, or both, may result in determined ratios that are offset from the fitted curve. Hence, a least squares adjustment, employing a standard algorithm, is conducted of the quadratic equation second order curve to the determined ratios at the predetermined displacements, smoothing the curve and eliminating a likely error. Additionally, the adjustment may have predetermined limits, such that a point whose determined ratio is outside the predetermined limits will be ignored and the curve refitted to the remaining determined ratios.

As the result of the curve fitting, the fitted locations of the servo edges of a set may be found to be incorrect. Two steps are taken to further adjust the curves to the correct locations of the servo edges. In a first step, the position of the center of each curve is calculated from the end points of the curve.

The calculation comprises determining the positions of each of the end points on the curve, and dividing by two. The calculation may comprise calculating:

$$(b_2+b_1+b_0+b_0)/2.$$

Then, the logic 465 determines the lateral distance between lateral positions of the tape head at the curve fitted ratios which indicate each of the linear servo edges of the set; and adjusts the curve fitted ratios to cause the determined lateral distance to equal the nominal or theoretical ideal separation distance.

As discussed above, alternative curve fitting methodologies may be employed to fit each respective curve comprising the converted independent position sensor lateral positions of the selected frequency components with respect to the converted ratios of the servo signals to calibrate the expected position error signals for the servo loop at the laterally offset servo index positions with respect to the sensed servo edge or edges. In step 370 of FIG. 5, the process is repeated for "PES 2" and "PES 3".

Figure 14:
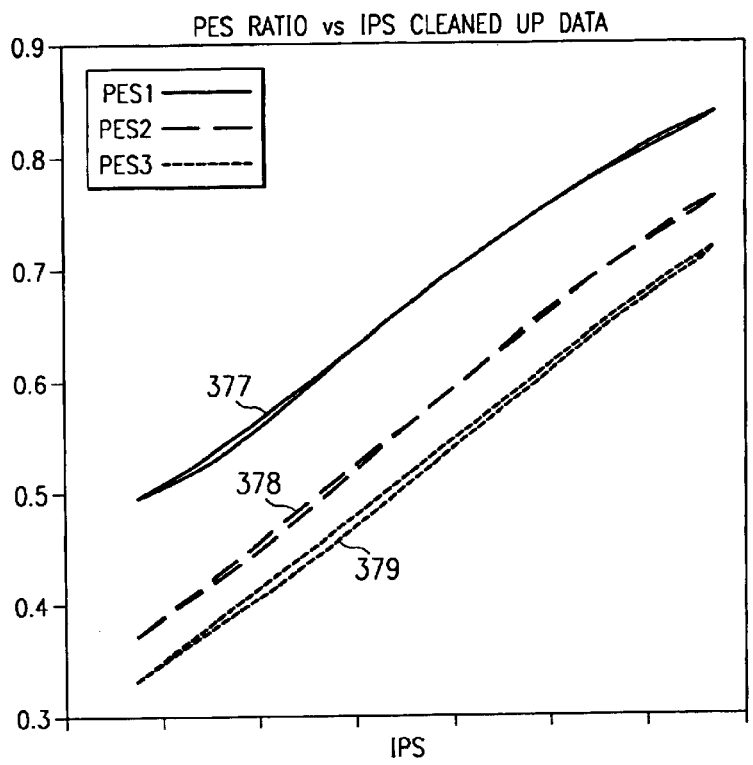
FIG. 14 is a diagrammatic illustration of curve fitted converted independent position sensor lateral positions of FIG. 12 with respect to the converted ratios of the servo signal ratios of FIG. 13.

FIG. 14 illustrates waveforms 377, 378 and 379, representing, respectively, the fitted curves of the ratios of three servo sensors at the respective edges, representing, respectively, "PES 1", "PES 2", and "PES 3". The servo sensors may comprise servo sensors 520–522, 530–532 or 540–542 of FIG. 2.

In step 380, the results are qualified against a predetermined criteria to make sure that they are reasonable. For example, the predetermined criteria may indicate that no correct calibration may be made, perhaps due to damage to the magnetic tape. In step 381, the determination is made whether more edges or sets of edges remain to be calibrated. If so, the process cycles back to step 301 to again inject the sinusoidal pattern while following the desired edges, and conduct the calibration. If all of the edges have been calibrated, the process is completed in step 383.

Figure 15:
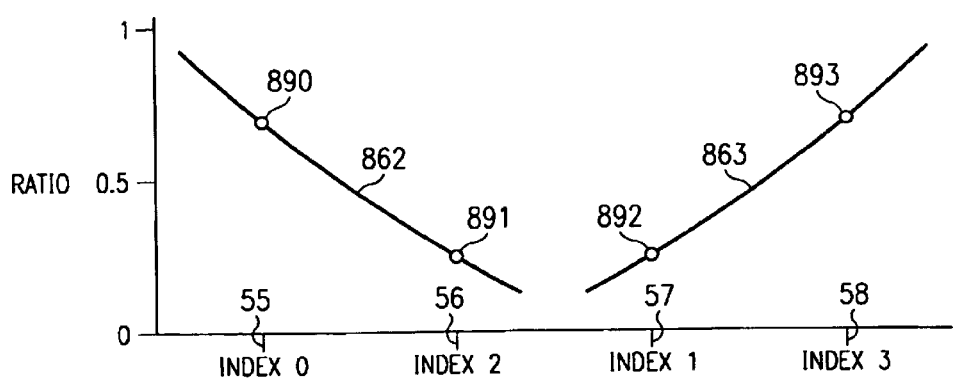
FIG. 15 is a diagrammatic representation of the calibrated servo index positions along the curve fitted ratio between the sensed servo signals of each of two parallel linear edges, where the center recorded servo signal generating the edges is of a relatively strong amplitude.
Figure 16:
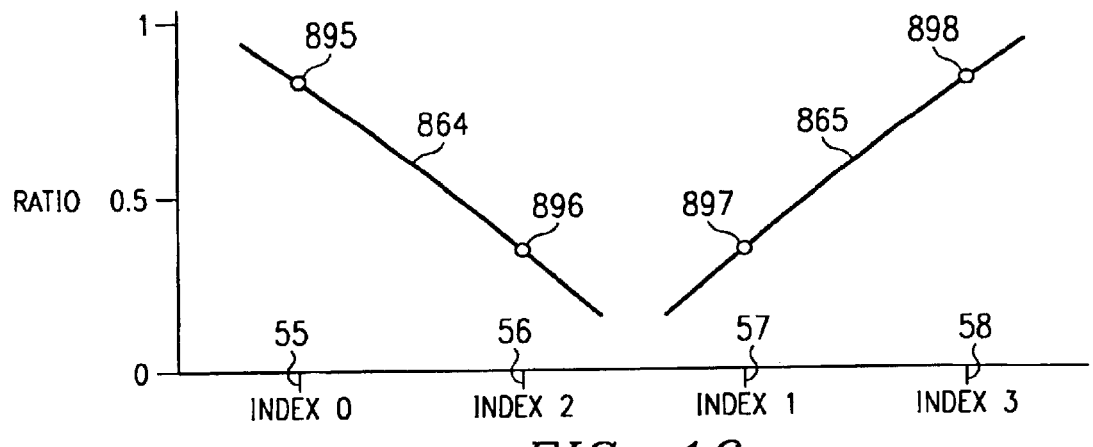
FIG. 16 is a diagrammatic representation of the calibrated servo index positions along the curve fitted ratio between the sensed servo signals of each of two parallel linear edges, where the center recorded servo signal generating the edges is of a relatively weak amplitude.

FIGS. 15 and 16 illustrate examples of calibrated and curve fitted curves that originated as the ratio and independent position sensor measurements of FIGS. 6 and 7. In FIGS. 15 and 16 the curves represent the ratios between the sensed servo signals of each of two parallel linear servo edges of a set of servo edges, at various lateral positions of the servo sensors. In accordance with the present invention, the ratios of the curves provide a means to calibrate expected position error signals for the servo loop at the laterally offset servo index positions with respect to the sensed servo edges of the set of linear servo edges. Thus, in FIG. 15, the center recorded servo signal generating the edges is of a relatively strong amplitude, and the present invention provides curves 862 and 863 to calibrate the positioning of the servo index positions. In FIG. 16, the center recorded servo signal generating the edges is of a relatively weak amplitude, and the present invention provides curves 864 and 865 to calibrate the positioning of the servo index positions.

Thus, referring to FIGS. 3 and 15, as an example, the servo index positions 55, 56, 57 and 58 are calibrated along curves 862 and 863 at position error signals represented by ratios 890, 891, 892 and 893, respectively. Referring additionally to FIGS. 3 and 16, the servo index positions 55, 56, 57 and 58 are calibrated along curves 864 and 865 at position error signals represented by ratios 895, 896, 897 and 898, respectively.

Therefore, the present invention provides calibration of the servo index positions which are laterally offset from the servo edges comprising interfaces between two dissimilar recorded servo signals.

FIGS. 17, 18, 19A and 19B illustrate an embodiment of a servo detector 28 in accordance with the incorporated Ser.

No. 09/413,327 application. Briefly, referring to FIG. 17, the analog servo signals are sensed at the servo element of the tape head 20, and the servo detector 28 converts the analog servo signals to asynchronous digital samples of the signal in analog front end 65, and a digital servo track decoder 66 decodes the digital samples and determines the amplitudes of the envelopes of the minimum and the maximum signals represented by the digital samples.

Figure 17:
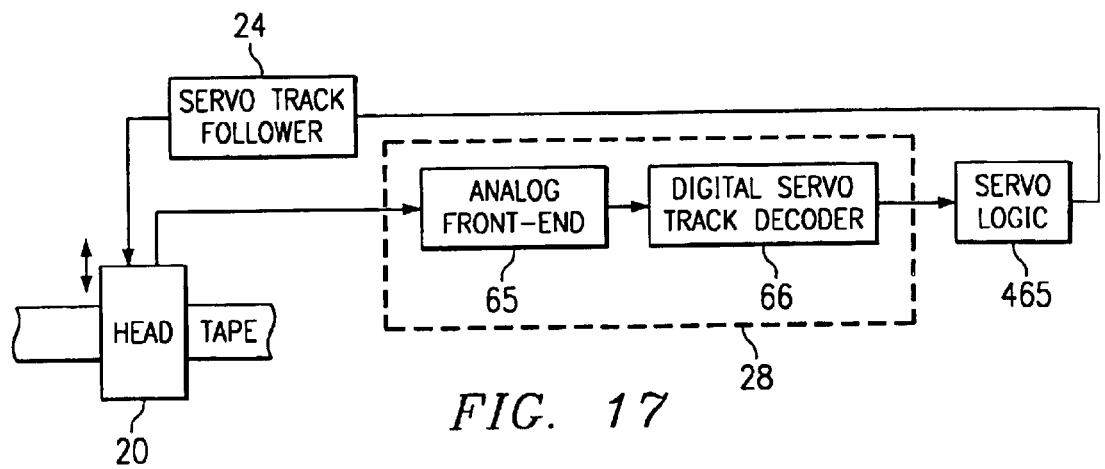
FIGS. 17 and 18 are block diagrams of a servo detector for detecting the dissimilar servo signals of the servo edges of FIG. 2.
Figure 18:
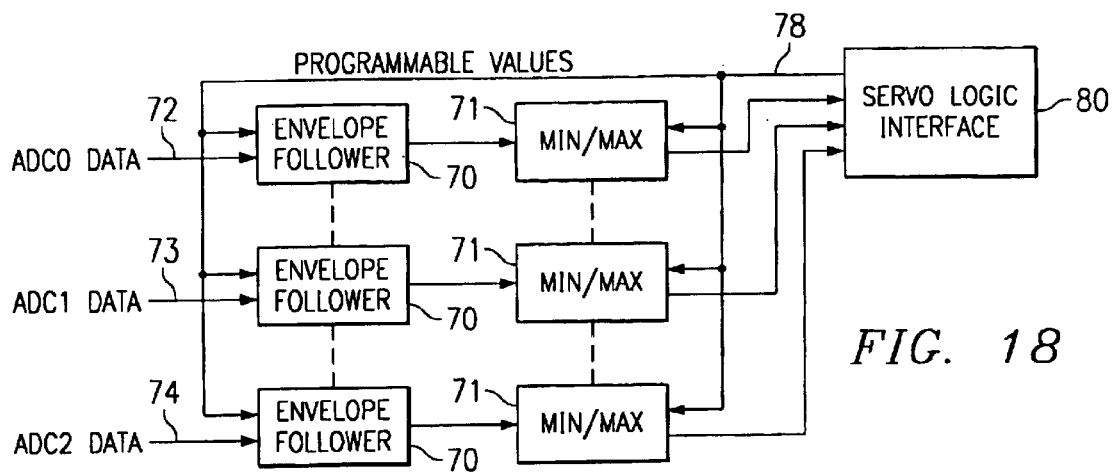

FIG. 18 illustrates a plurality of the digital servo track decoders of FIG. 17, each comprising an envelope follower 70 and a minimum/maximum detector 71. Each of the envelope followers 70 receives the asynchronous digital samples of a different servo element from an associated analog front end on a respective line 72–74. The minimum/maximum detectors determine the relative amplitudes of the sensed servo signals and provide the relative amplitudes to the servo logic 465 at an interface 80 for determining the ratios.

Figure 19A:
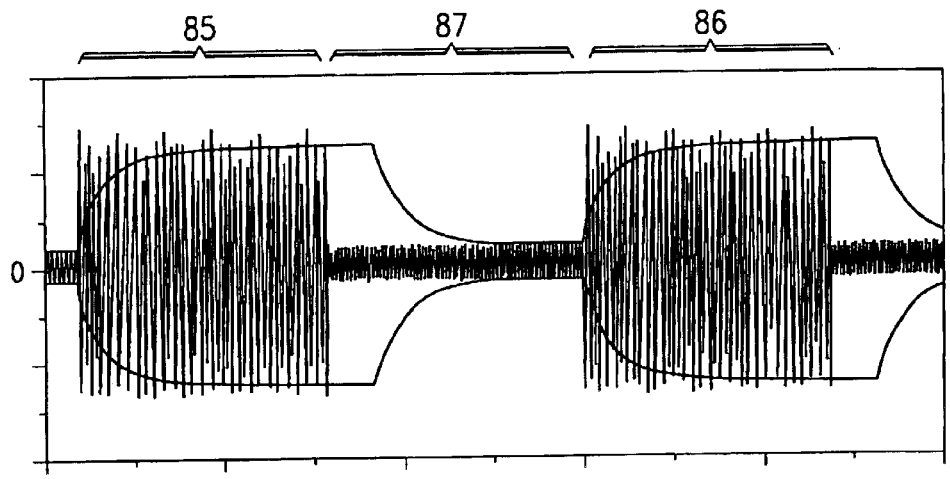
FIGS. 19A and 19B are illustrations of exemplary analog servo signals for different positions of a servo sensor with respect to a servo edge of FIG. 2 and examples of the digital envelopes of the respective analog servo signals generated by the servo detector of FIGS. 17 and 18.
Figure 19B:
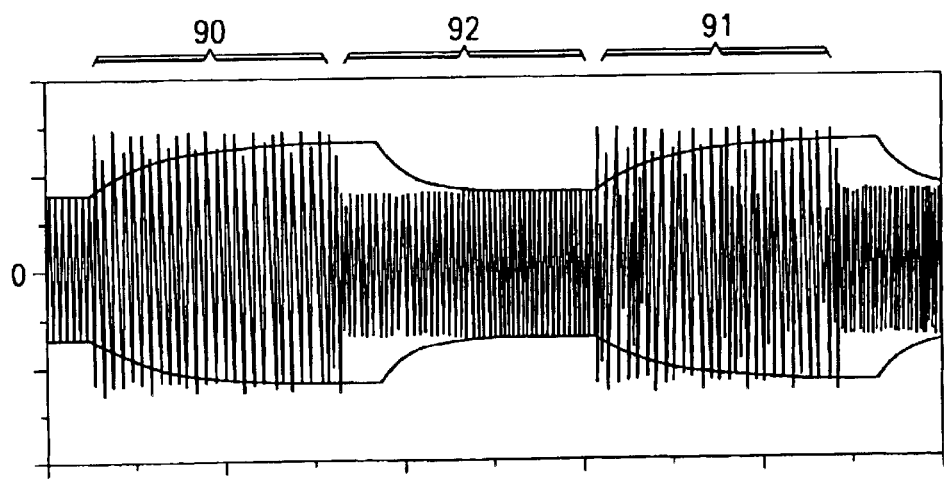

FIGS. 19A and 19B illustrate wave forms of the analog signal from the servo transducer at, respectively, positions 506 and 508 of FIG. 3. Thus, in FIG. 19A, the bursts 85 and 86 formed while the servo transducer is at position 506 of FIG. 3 from the combination of the first frequency and the second frequency burst is at a high amplitude, but the burst 87 formed from the combination of the first frequency and the null signal is at a very low amplitude because only a small portion of the servo transducer is positioned over the first frequency. In FIG. 19B, the bursts 90 and 91 formed while the servo transducer is at position 508 of FIG. 3 from the combination of the first frequency and the second frequency burst is at a high amplitude, as is the burst 92 formed from the combination of the first frequency and the null signal, because the servo transducer is positioned primarily over the first frequency. The incorporated Ser. No. 09/413,327 application digitally distinguishes the bursts and then provides the amplitudes of the envelopes of the respective bursts so that the ratio may be determined.

Figure 20:
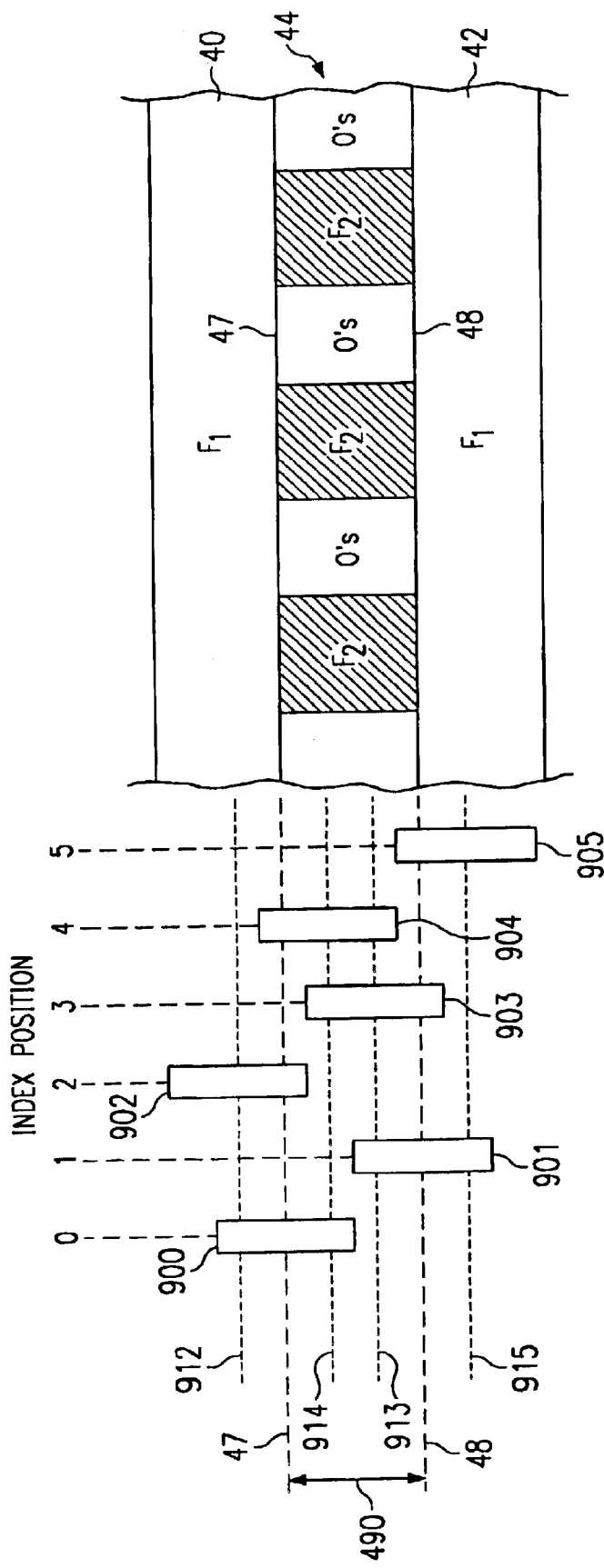
FIG. 20 is a detailed diagrammatic representation of a magnetic tape format providing six servo index positions in one set of two linear servo edges of the magnetic tape of FIG. 2.

FIG. 20 illustrates another embodiment of displaced index positions that may be employed with the present invention. At the "0" or "1" index positions, the servo element is located at position 900 centered on servo edge 47 or at position 901 centered on servo edge 48. Additional index positions are provided which are aligned such that a servo element is displaced from an edge 47 or 48 located along lines 912–915 about ⅓ the width of the middle track 44 away from the servo edge 47 or 48 in either direction. As the result, the number of index positions becomes six. In order to center the data read/write elements in the "2" and "5" index positions, the servo read element must be located at position 902 or at position 905, and will read a minimum signal that has an amplitude ratio of about ⅚ of the maximum signal, and to center the data read/write elements in the "3" and "4" index positions, the servo read element must be located at position 903 or at position 904, and will read a minimum signal that has an amplitude ratio of about ⅙ of the maximum signal. Thus, referring additionally to FIGS. 9 and 10, the servo logic 465 will calibrate different sets of position error signals representing different ratios along curves 862 and 863, or along curves 864 and 865 for determining the displacements of the servo index positions, including the on-edge positions 900 and 901 for the servo edges.

While the preferred embodiments of the present invention have been illustrated in detail, it should be apparent that modifications and adaptations to those embodiments may occur to one skilled in the art without departing from the scope of the present invention as set forth in the following claims.

We claim:

1. A servo system for calibrating servo index positions of a magnetic tape for track following, said magnetic tape having at least one set of parallel linear servo edges, each said servo edge comprising an interface between two dissimilar recorded servo signals, each said set of servo edges comprising one of said servo edges on each of opposite lateral sides of a middle said recorded servo signal, at least a plurality of said servo index positions laterally offset from said linear servo edges, said servo system comprising:

at least one servo sensor of a tape head, said tape head movable laterally of said magnetic tape, said at least one servo sensor sensing said recorded servo signals of said magnetic tape comprising at least one said servo edge of said dissimilar recorded servo signals;

a servo detector coupled to said at least one servo sensor for determining a ratio of said servo signals sensed by said servo sensor and providing digital servo signals at a predetermined sample rate;

an independent position sensor to sense lateral position of said magnetic tape with respect to said tape head servo sensor;

a servo loop for positioning said tape head laterally with respect to said magnetic tape to track follow said sensed servo signals at specific position error signals representing displacements from said at least one linear servo edge as determined from ratios of said sensed servo signals as determined by said servo detector; and logic coupled to said servo detector, said independent position sensor, and said servo loop, said logic:

operating said servo loop to laterally position said at least one servo sensor to sense said servo signals at continually altered digital set points of said ratios of said sensed servo signals, said set points altered at said sample rate of said servo loop, said set points altered to inject a predetermined sinusoidal pattern single frequency positioning signal, whereby said servo loop track follows said at least one linear servo edge with said servo loop at said continually altered digital set points;

digitally determining, from said independent position sensor at said sample rate, said lateral position of said tape head servo sensor with respect to said servo edge locations of said magnetic tape;

digitally determining, from said servo detector at said sample rate, said ratios of said servo signals sensed by said servo sensor;

converting said digitally determined independent position sensor lateral positions to frequency components;

converting said digitally determined ratios of said servo signals to frequency components;

selecting from said frequency components of said independent position sensor lateral positions, said predetermined sinusoidal pattern single frequency and at least one harmonic thereof;

selecting from said frequency components of said servo signal, said predetermined sinusoidal pattern single frequency and at least one harmonic thereof;

converting said independent position sensor selected frequency components to independent position sensor lateral positions;

converting said servo signal selected frequency components to ratios of said servo signals; and fitting a curve to said converted independent position sensor lateral positions of said selected frequency components with respect to said converted ratios of said servo signals of said selected frequency components, to calibrate expected said position error signals for said servo loop at said laterally offset servo index positions with respect to said at least one sensed servo edge.

2. The servo system of claim 1, wherein said logic, in operating said servo loop to laterally position said at least one servo sensor, said injected predetermined sinusoidal pattern single frequency positioning signal comprises a single frequency selected so said single frequency and major harmonics thereof each differs from intrinsic operational frequencies of said track following servo system.

3. The servo system of claim 1, wherein said logic, in operating said servo loop to laterally position said at least one servo sensor, said injected predetermined sinusoidal pattern single frequency positioning signal comprises an integer number of said discrete digital set points of said ratios of said sensed servo signals.

4. The servo system of claim 1, wherein said logic, in converting said digitally determined independent position sensor lateral positions to frequency components, and in converting said digitally determined ratios of said servo signals to frequency components, comprises conducting fast Fourier transforms (FFT) of said digitally determined independent position sensor lateral positions, and of said digitally determined ratios of said servo signals to frequency components.

5. The servo system of claim 4, wherein said logic, in converting said selected frequency components to independent position sensor lateral positions, and in converting said servo signal selected frequency components to ratios of said servo signals, comprises conducting inverse fast Fourier transforms (IFFT) of said selected frequency components.

6. The servo system of claim 5, wherein said logic, in fitting a curve to said converted independent position sensor lateral positions of said selected frequency components with respect to said converted ratios of said servo signals of said selected frequency components, comprises canceling said injected sinusoidal pattern and employing a least squares method of curve fitting.

7. A servo system for calibrating servo index positions of a magnetic tape for track following, said magnetic tape having at least one set of parallel linear servo edges, each said servo edge comprising an interface between two dissimilar recorded servo signals, each said set of servo edges comprising one of said servo edges on each of opposite lateral sides of a middle said recorded servo signal, at least a plurality of said servo index positions laterally offset from said linear servo edges, said servo system comprising:

at least one servo sensor of a tape head, said tape head movable laterally of said magnetic tape, said at least one servo sensor sensing said recorded servo signals of said magnetic tape comprising at least one said servo edge of said dissimilar recorded servo signals;

a servo detector coupled to said at least one servo sensor for determining a ratio of said servo signals sensed by said servo sensor and providing digital servo signals at a predetermined sample rate;

an independent position sensor to sense lateral position of said magnetic tape with respect to said tape head servo sensor;

a servo loop for positioning said tape head laterally with respect to said magnetic tape to track follow said sensed servo signals at specific position error signals representing displacements from said at least one linear servo edge as determined from ratios of said sensed servo as determined by said servo detector; and logic coupled to said servo detector, said independent position sensor, and said servo loop, said logic:

operating said servo loop to laterally position said at least one servo sensor to sense said servo signals at continually altered digital set points of said ratios of said sensed servo signals, said set points altered at said sample rate of said servo loop, said set points altered to inject a predetermined sinusoidal pattern single frequency positioning signal, said set points comprising an integer number of said discrete digital set points of said ratios of said sensed servo signals altered at said sample rate of said servo loop, said set points altered to inject a predetermined sinusoidal pattern single frequency positioning signal selected so said single frequency and major harmonics thereof each differs from intrinsic operational frequencies of said track following servo system, whereby said servo loop track follows said at least one linear servo edge with said servo loop at said continually altered digital set points;

digitally determining, from said independent position sensor at said sample rate, said lateral position of said tape head servo sensor with respect to said servo edge locations of said magnetic tape;

digitally determining, from said servo detector at said sample rate, said ratios of said servo signals sensed by said servo sensor;

converting said digitally determined independent position sensor lateral positions to frequency components, comprising conducting fast Fourier transforms (FFT) of said digitally determined independent position sensor lateral positions;

converting said digitally determined ratios of said servo signals to frequency components, comprising conducting fast Fourier transforms (FFT) of said digitally determined ratios of said servo signals;

selecting from said frequency components of said independent position sensor lateral positions, said predetermined sinusoidal pattern single frequency and at least one harmonic thereof;

selecting from said frequency components of said servo signal, said predetermined sinusoidal pattern single frequency and at least one harmonic thereof;

converting said independent position sensor selected frequency components to independent position sensor lateral positions, comprising conducting inverse fast Fourier transforms (IFFT) of said independent position sensor selected frequency components;

converting said servo signal selected frequency components to ratios of said servo signals, comprising conducting inverse fast Fourier transforms (IFFT) of said servo signal selected frequency components; and fitting a curve to said converted independent position sensor lateral positions of said selected frequency components with respect to said converted ratios of said servo signals of said selected frequency components, to calibrate expected said position error signals for said servo loop at said laterally offset servo index positions with respect to said at least one sensed servo edge.

8. A method for calibrating servo index positions of a magnetic tape in a track following servo system, said magnetic tape having at least one set of parallel linear servo edges, each said servo edge comprising an interface between two dissimilar recorded servo signals, each said set of servo edges comprising one of said servo edges on each of opposite lateral sides of a middle said recorded servo signal, at least a plurality of said servo index positions laterally offset from at least one of said linear servo edges, said track following servo system comprising at least one servo sensor of a tape head for sensing said recorded servo signals of said magnetic tape and providing digital servo signals at a predetermined sample rate, a servo loop for positioning said tape head laterally with respect to said magnetic tape to track follow said sensed servo signals at specific position error signals representing displacements from said at least one linear servo edge as determined from ratios of said sensed servo signals, and an independent position sensor to sense lateral position of said magnetic tape with respect to said tape head servo sensor, said method comprising:

laterally positioning said at least one servo sensor to sense said servo signals at continually altered digital set points of said ratios of said sensed servo signals, said set points altered at said sample rate of said servo loop, said set points altered to inject a predetermined sinusoidal pattern single frequency positioning signal;

track following said at least one linear servo edge with said servo loop at said continually altered digital set points;

digitally determining independent position sensor lateral position of said servo edge locations of said magnetic tape at said sample rate;

digitally determining said ratios of said servo signals sensed by said servo sensor at said sample rate;

converting said digitally determined independent position sensor lateral positions to frequency components;

converting said digitally determined ratios of said servo signals to frequency components;

selecting from said frequency components of said independent position sensor lateral positions, said predetermined sinusoidal pattern single frequency and at least one harmonic thereof;

selecting from said frequency components of said servo signal, said predetermined sinusoidal pattern single frequency and at least one harmonic thereof;

converting said independent position sensor selected frequency components to independent position sensor lateral positions;

converting said servo signal selected frequency components to ratios of said servo signals; and fitting a curve to said converted independent position sensor lateral positions of said selected frequency components with respect to said converted ratios of said servo signals of said selected frequency components, to calibrate expected said position error signals for said servo loop at said laterally offset servo index positions with respect to said at least one sensed servo edge.

9. The method of claim 8, wherein said laterally positioning step injected predetermined sinusoidal pattern single frequency positioning signal is selected so said single frequency and major harmonics thereof each differs from intrinsic operational frequencies of said track following servo system.

10. The method of claim 8, wherein said laterally positioning step injected predetermined sinusoidal pattern single frequency positioning signal comprises an integer number of said discrete digital set points of said ratios of said sensed servo signals.

11. The method of claim 8, wherein said step of converting said digitally determined independent position sensor lateral positions to frequency components, and said step of converting said digitally determined ratios of said servo signals to frequency components, each comprises conducting fast Fourier transforms (FFT) of said digitally determined independent position sensor lateral positions, and of said digitally determined servo signals.

12. The method of claim 11, wherein said step of converting said selected frequency components to independent position sensor lateral positions, and said step of converting said servo signal selected frequency components to ratios of said servo signals, each comprises conducting inverse fast Fourier transforms (IFFT) of said selected frequency components.

13. The method of claim 12, wherein said step of fitting a curve to said converted independent position sensor lateral positions of said selected frequency components with respect to said converted ratios of said servo signals of said selected frequency components, comprises canceling said injected sinusoidal pattern and employing a least squares method of curve fitting.

14. A method for calibrating servo index positions of a magnetic tape in a track following servo system, said magnetic tape having at least one set of parallel linear servo edges, each said servo edge comprising an interface between two dissimilar recorded servo signals, each said set of servo edges comprising one of said servo edges on each of opposite lateral sides of a middle said recorded servo signal, at least a plurality of said servo index positions laterally offset from said linear servo edges, said track following servo system comprising at least one servo sensor of a tape head for sensing said recorded servo signals of said magnetic tape and providing digital servo signals at a predetermined sample rate, a servo loop for positioning said tape head laterally with respect to said magnetic tape to track follow said sensed servo signals at specific position error signals representing displacements from at least one of said linear servo edges as determined from ratios of said sensed servo signals, and an independent position sensor to sense lateral position of said magnetic tape with respect to said tape head servo sensor, said method comprising:

laterally positioning said at least one servo sensor to sense said servo signals at continually altered digital set points of said ratios of said sensed servo signals, said set points comprising an integer number of said discrete digital set points of said ratios of said sensed servo signals altered at said sample rate of said servo loop, said set points altered to inject a predetermined sinusoidal pattern single frequency positioning signal selected so said single frequency and major harmonics thereof each differs from intrinsic operational frequencies of said track following servo system;

track following said at least one linear servo edge with said servo loop at said continually altered digital set points;

digitally determining independent position sensor lateral position of said servo edge locations of said magnetic tape at said sample rate;

digitally determining said ratios of said servo signals sensed by said servo sensor at said sample rate;

converting said digitally determined independent position sensor lateral positions to frequency components, comprising conducting fast Fourier transforms (FFT) of said digitally determined independent position sensor lateral positions;

converting said digitally determined ratios of said servo signals to frequency components, comprising conducting fast Fourier transforms (FFT) of said digitally determined servo signals;

selecting from said frequency components of said independent position sensor lateral positions, said predetermined sinusoidal pattern single frequency and said major harmonics thereof;

selecting from said frequency components of said servo signal, said predetermined sinusoidal pattern single frequency and at least one harmonic thereof;

converting said selected frequency components to independent position sensor lateral positions, comprising conducting inverse fast Fourier transforms (IFFT) of said selected frequency components;

converting said servo signal selected frequency components to ratios of said servo signals, comprising conducting inverse fast Fourier transforms (IFFT) of said selected frequency components; and fitting a curve to said converted independent position sensor lateral positions of said selected frequency components with respect to said converted ratios of said servo signals of said selected frequency components, to calibrate expected said position error signals for said servo loop at said laterally offset servo index positions with respect to said at least one sensed servo edge.

15. A tape drive for reading and/or writing information with respect to a magnetic tape, said magnetic tape having at least one set of parallel linear servo edges longitudinally oriented with respect to said magnetic tape, each said servo edge comprising an interface between two dissimilar recorded servo signals, each said set of servo edges comprising one of said servo edges on each of opposite lateral sides of a middle said recorded servo signal, at least a plurality of said servo index positions laterally offset from said linear servo edges, said tape drive comprising:

a motion system for moving said magnetic tape in said longitudinal direction;

a tape head for reading and/or writing data with respect to said magnetic tape, said tape head movable laterally of said magnetic tape;

at least one servo sensor of said tape head, said at least one servo sensor sensing said recorded servo signals of said magnetic tape comprising at least one said servo edge of said dissimilar recorded servo signals;

a servo detector coupled to said at least one servo sensor for determining a ratio of said servo signals sensed by said servo sensor and providing digital servo signals at a predetermined sample rate;

an independent position sensor to sense lateral position of said magnetic tape with respect to said tape head servo sensor;

a servo loop for positioning said tape head laterally with respect to said magnetic tape to track follow said sensed servo signals at specific position error signals representing displacements from said linear servo edges as determined from ratios of said sensed servo signals as determined by said servo detector; and logic coupled to said servo detector, said independent position sensor, and said servo loop, said logic:

operating said servo loop to laterally position said at least one servo sensor to sense said servo signals at continually altered digital set points of said ratios of said sensed servo signals, said set points altered at said sample rate of said servo loop, said set points altered to inject a predetermined sinusoidal pattern single frequency positioning signal, whereby said servo loop track follows said at least one linear servo edge with said servo loop at said continually altered digital set points;

digitally determining, from said independent position sensor at said sample rate, said lateral position of said tape head servo sensor with respect to said servo edge locations of said magnetic tape;

digitally determining, from said servo detector at said sample rate, said ratios of said servo signals sensed by said servo sensor;

converting said digitally determined independent position sensor lateral positions to frequency components;

converting said digitally determined ratios of said servo signals to frequency components;

selecting from said frequency components of said independent position sensor lateral positions, said predetermined sinusoidal pattern single frequency and at least one harmonic thereof;

selecting from said frequency components of said servo signal, said predetermined sinusoidal pattern single frequency and at least one harmonic thereof;

converting said independent position sensor selected frequency components to independent position sensor lateral positions;

converting said servo signal selected frequency components to ratios of said servo signals; and fitting a curve to said converted independent position sensor lateral positions of said selected frequency components with respect to said converted ratios of said servo signals of said selected frequency components, to calibrate expected said position error signals for said servo loop at said laterally offset servo index positions with respect to said at least one sensed servo edge.

16. The tape drive of claim 15, wherein said logic, in operating said servo loop to laterally position said at least one servo sensor, said injected predetermined sinusoidal pattern single frequency positioning signal comprises a single frequency selected so said single frequency and major harmonics thereof each differs from intrinsic operational frequencies of said track following servo system.

17. The tape drive of claim 15, wherein said logic, in operating said servo loop to laterally position said at least one servo sensor, said injected predetermined sinusoidal pattern single frequency positioning signal comprises an integer number of said discrete digital set points of said ratios of said sensed servo signals.

18. The tape drive of claim 15, wherein said logic, in converting said digitally determined independent position sensor lateral positions to frequency components, and in converting said digitally determined ratios of said servo signals to frequency components, comprises conducting fast Fourier transforms (FFT) of said digitally determined independent position sensor lateral positions, and of said digitally determined ratios of said servo signals to frequency components.

19. The tape drive of claim 18, wherein said logic, in converting said selected frequency components to independent position sensor lateral positions, and in converting said servo signal selected frequency components to ratios of said servo signals, comprises conducting inverse fast Fourier transforms (IFFT) of said selected frequency components.

20. The tape drive of claim 19, wherein said logic, in fitting a curve to said converted independent position sensor lateral positions of said selected frequency components with respect to said converted ratios of said servo signals of said selected frequency components, comprises canceling said injected sinusoidal pattern and employing a least squares method of curve fitting.

21. A tape drive for reading and/or writing information with respect to a magnetic tape, said magnetic tape having at least one set of parallel linear servo edges longitudinally oriented with respect to said magnetic tape, each said servo edge comprising an interface between two dissimilar recorded servo signals, each said set of servo edges comprising one of said servo edges on each of opposite lateral sides of a middle said recorded servo signal, at least a plurality of said servo index positions laterally offset from said linear servo edges, said tape drive comprising:

a motion system for moving said magnetic tape in said longitudinal direction;

a tape head for reading and/or writing data with respect to said magnetic tape, said tape head movable laterally of said magnetic tape;

at least one servo sensor of said tape head, said at least one servo sensor sensing said recorded servo signals of said magnetic tape comprising at least one said servo edge of said dissimilar recorded servo signals;

a servo detector coupled to said at least one servo sensor for determining a ratio of said servo signals sensed by said servo sensor and providing digital servo signals at a predetermined sample rate;

an independent position sensor to sense lateral position of said magnetic tape with respect to said tape head servo sensor;

a servo loop for positioning said tape head laterally with respect to said magnetic tape to track follow said sensed servo signals at specific position error signals representing displacements from said linear servo edges as determined from ratios of said sensed servo signals as determined by said servo detector; and logic coupled to said servo detector, said independent position sensor, and said servo loop, said logic:

operating said servo loop to laterally position said at least one servo sensor to sense said servo signals at continually altered digital set points of said ratios of said sensed servo signals, said set points altered at said sample rate of said servo loop, said set points altered to inject a predetermined sinusoidal pattern single frequency positioning signal, said set points comprising an integer number of said discrete digital set points of said ratios of said sensed servo signals altered at said sample rate of said servo loop, said set points altered to inject a predetermined sinusoidal pattern single frequency positioning signal selected so said single frequency and major harmonics thereof each differs from intrinsic operational frequencies of said track following servo system, whereby said servo loop track follows said at least one linear servo edge with said servo loop at said continually altered digital set points;

digitally determining, from said independent position sensor at said sample rate, said lateral position of said tape head servo sensor with respect to said servo edge locations of said magnetic tape;

digitally determining, from said servo detector at said sample rate, said ratios of said servo signals sensed by said servo sensor;

converting said digitally determined independent position sensor lateral positions to frequency components, comprising conducting fast Fourier transforms (FFT) of said digitally determined independent position sensor lateral positions;

converting said digitally determined ratios of said servo signals to frequency components, comprising conducting fast Fourier transforms (FFT) of said digitally determined ratios of said servo signals;

selecting from said frequency components of said independent position sensor lateral positions, said predetermined sinusoidal pattern single frequency and at least one harmonic thereof;

selecting from said frequency components of said servo signal, said predetermined sinusoidal pattern single frequency and at least one harmonic thereof;

converting said independent position sensor selected frequency components to independent position sensor lateral positions, comprising conducting inverse fast Fourier transforms (IFFT) of said independent position sensor selected frequency components;

converting said servo signal selected frequency components to ratios of said servo signals, comprising conducting inverse fast Fourier transforms (IFFT) of said servo signal selected frequency components; and fitting a curve to said converted independent position sensor lateral positions of said selected frequency components with respect to said converted ratios of said servo signals of said selected frequency components, to calibrate expected said position error signals for said servo loop at said laterally offset servo index positions with respect to said at least one sensed servo edge.

* * * * *